No. 881,629. PATENTED MAR. 10, 1908.
G. R. SMITH.
SHOCK ABSORBING DEVICE.
APPLICATION FILED JUNE 3, 1907.

WITNESSES
M. E. Flaherty.
M. V. Foley

INVENTOR
George R. Smith
by
Charles Raymond &c.
his atty

UNITED STATES PATENT OFFICE.

GEORGE R. SMITH, OF DOVER, NEW HAMPSHIRE.

SHOCK-ABSORBING DEVICE.

No. 881,629.  Specification of Letters Patent.  Patented March 10, 1908.

Application filed June 3, 1907. Serial No. 377,080.

*To all whom it may concern:*

Be it known that I, GEORGE R. SMITH, of Dover, in the county of Strafford and State of New Hampshire, have invented a new and useful Improvement in Shock-Absorbing Devices, of which the following is a full, clear, and exact description, reference being had to the accompanying drawings, forming a part of this specification, in explaining its nature.

My invention relates to an improvement in that type of shock absorber especially adapted to be used with motor vehicles although it is equally applicable to any vehicle where such kind of device could advantageously be used.

The object of my invention is to provide a shock absorber of simple construction which can be made and sold at comparatively small cost and be applied to any vehicle.

It is the further object of my invention to so form or adapt the device that it may be used in conjunction with the supporting springs of a vehicle and will act not only to supplement the yielding support of the main supporting springs upon depression thereof, but will also effectively prevent the sudden reflex or back lash of the supporting springs upon a sudden release of the weight or force acting to depress the same.

The device can best be seen and understood by reference to the drawings in which—

Figure 1:
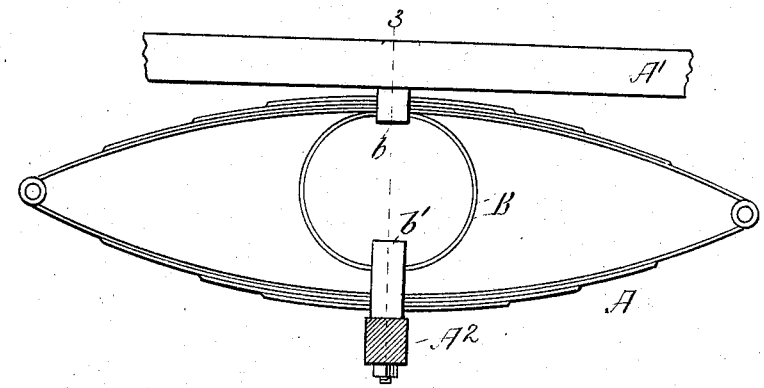
Figure 2:
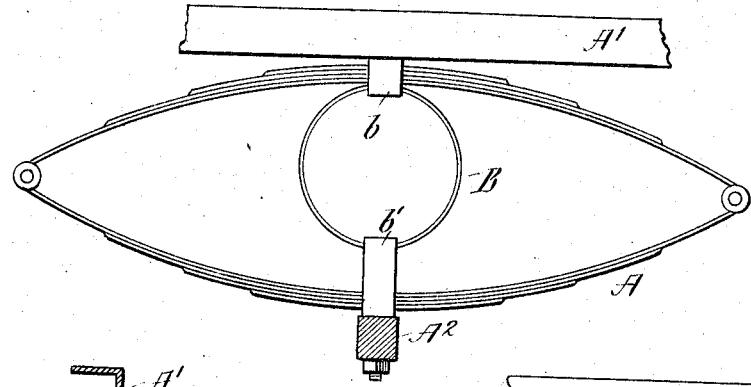
Figure 3:
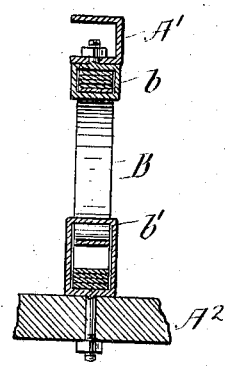
Figure 4:
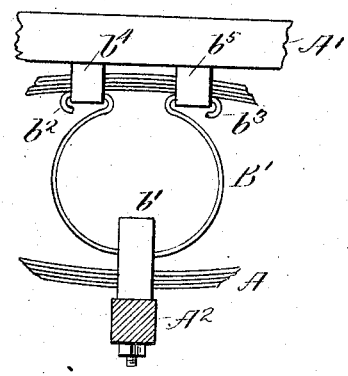

Figure 1 shows the device in side elevation, the device occupying a normal operative position. Fig. 2 shows the device in side elevation and operating to prevent the reflex of the supporting springs in connection with which the device is used. Fig. 3 shows a section on the line 3—3 of Fig. 1. Fig. 4 shows in side elevation a modification of the device to which reference will hereinafter be made.

I have shown the device used with a common form of elliptical spring although of course the device may be used in connection with any form of arch-supporting spring.

Referring, therefore, to the drawings, A represents an elliptical supporting spring interposed between a part $A^1$, which corresponds with the sill of a vehicle or part supported and the part or axle $A^2$ acting as a base of support. Contained within the supporting spring A is an auxiliary spring B with a loop. This spring is preferably made of a continuous band of metal and slightly elliptical in form as shown in Fig. 1. The auxiliary spring is held in place by means of a strap $b$ which preferably connects with the part supported $A^1$. From its point of attachment the spring B extends in the direction of the supporting part $A^2$ but preferably not so far as to bear against such part or that portion of the supporting spring resting thereon. The effect is that the auxiliary spring will have no normal supporting action, but will only supplement the main supporting spring A after the auxiliary spring has become depressed a sufficient amount to engage with the main spring or other resisting fixture. The advantage of this construction is that the part supported $A^1$ will normally have the easily yielding support of the spring A which becomes reinforced only when the spring A has become depressed a determinate amount. After the depression of the spring A upon the sudden release of the pressure or force acting to depress the spring it will have a reflex or back lash which unless rectified is oftentimes more liable to break the spring than a force or pressure acting to depress it, and the manner of resisting or governing such reflex or backlash of the spring A forms an essential feature of my invention. For the purpose therefore of enabling the spring B to yieldingly govern or control the reflex of the main supporting spring A I have combined with this spring a stop $b^1$ comprising a metal band or strap which is preferably secured to the axle or supporting part $A^2$ or to that part opposite that to which the spring B is secured and which passes through the loop of the auxiliary spring. The arrangement of the strap $b^1$ is such that the auxiliary spring may occupy a normally inoperative position as before described and reinforce the spring A only after a determinate depression thereof. The stop $b^1$ has, however, the effect of holding the auxiliary spring whereby it may be drawn out or distorted by the same force which acts to draw out the main supporting spring A. In other words, when the reflex force or back lash of the main supporting spring acts to draw out such spring beyond its normal position the auxiliary spring B, retained by the stop, will act to prevent by its yielding retention such drawing out or distortion.

The device is very simple and can be applied to a vehicle having any kind of a spring, whether such spring be elliptical or other form. I prefer that the auxiliary spring shall be a continuous band as shown in Figs. 1 and 2. However, such a construction is not necessary as may be seen in the construction shown in Fig. 4 where an auxiliary spring $B^1$ is shown acting in precisely the same manner as the spring B and which spring $B^1$ is not continuously elliptical in form, but is provided with ends $b^2$, $b^3$ which are attached to the part $A^1$ or part supported by means of retaining clips $b^4$, $b^5$.

Having thus fully described my invention, I claim and desire to secure by Letters Patent of the United States:

1. The combination with a main compressible arched spring of an auxiliary spring with a loop which auxiliary spring is contained within the arch of said main spring, a stop passing through the loop of said auxiliary spring whereby upon the reflex of said main spring after compression thereof said auxiliary spring will engage said stop and become drawn out thereby yieldingly stopping the reflex of said main spring.

2. The combination with a main compressible arched spring of an auxiliary spring with a loop which auxiliary spring is contained within the arch of said main spring, said auxiliary spring being mounted to occupy a position whereby it may reinforce said main spring only after compression, thereof, a stop passing through the loop of said auxiliary spring whereby upon the reflex of said main spring after compression thereof said auxiliary spring will engage said stop and become drawn out thereby stopping the reflex of said main spring.

GEORGE R. SMITH.

In the presence of—
JAS. F. GOODWIN,
WM. P. ROBERT.